United States Patent
Tsuruta et al.

(10) Patent No.: US 10,605,097 B2
(45) Date of Patent: Mar. 31, 2020

(54) TURBINE ROTOR BLADE AND TURBINE

(71) Applicant: Toshiba Energy Systems & Solutions Corporation, Kawasaki-shi (JP)

(72) Inventors: Kazutaka Tsuruta, Yokohama (JP); Shoko Ito; Iwataro Sato, Hiratsuka (JP)

(73) Assignee: Toshiba Energy Systems & Solutions Corporation, Kawasaki-shi (JP)

( * ) Notice: Subject to any disclaimer, the term of this patent is extended or adjusted under 35 U.S.C. 154(b) by 150 days.

(21) Appl. No.: 15/647,681

(22) Filed: Jul. 12, 2017

(65) Prior Publication Data

US 2017/0306767 A1 Oct. 26, 2017

Related U.S. Application Data

(63) Continuation of application No. PCT/JP2015/001009, filed on Feb. 26, 2015.

(51) Int. Cl.
*F01D 5/18* (2006.01)
*F02C 7/18* (2006.01)
(Continued)

(52) U.S. Cl.
CPC .......... *F01D 5/187* (2013.01); *F01D 5/081* (2013.01); *F01D 5/147* (2013.01); *F02C 7/18* (2013.01);
(Continued)

(58) Field of Classification Search
CPC . F01D 5/187; F01D 5/225; F01D 5/26; F01D 5/18; F01D 5/147; F01D 5/22; F05D 2240/81; F05D 2250/185
See application file for complete search history.

(56) References Cited

U.S. PATENT DOCUMENTS 3,533,712 A * 10/1970 Kercher .................. F01D 5/187
　　　　　　　　　　　　　　　　　　　　415/116
5,002,460 A *  3/1991 Lee ......................... F01D 5/188
　　　　　　　　　　　　　　　　　　　　415/115
(Continued)

FOREIGN PATENT DOCUMENTS

CN　　　　103459776　　　12/2013
EP　　　1 083 299 A2　　　3/2001
(Continued)

OTHER PUBLICATIONS

Machine translation of JP 2010053749-A (Year: 2010).*
(Continued)

*Primary Examiner* — Dwayne J White
*Assistant Examiner* — Danielle M. Christensen
(74) *Attorney, Agent, or Firm* — Oblon, McClelland, Maier & Neustadt, L.L.P.

(57) ABSTRACT

A turbine rotor blade comprises: a blade effective part; a snubber disposed on radially outer side of the blade effective part; a platform disposed on radially inner side of the blade effective part; and an implanted part disposed on radially inner side of the platform. A first flow path is formed inside the implanted part for a cooling medium to pass through. A second flow path is formed inside the platform for the cooling medium having passed through the first flow to pass through. A blade effective part flow path is formed inside the blade effective part for the cooling medium having passed through the second flow path to pass through. A snubber flow path is formed inside the snubber for the cooling medium having passed through the blade effective part flow paths to pass through.

8 Claims, 7 Drawing Sheets

(51) Int. Cl.
*F01D 5/08* (2006.01)
*F01D 5/14* (2006.01)

(52) U.S. Cl.
CPC .... *F05D 2240/303* (2013.01); *F05D 2240/81* (2013.01); *F05D 2250/185* (2013.01)

(56) References Cited

U.S. PATENT DOCUMENTS

| | | | |
|---|---|---|---|
| 5,122,033 A | 6/1992 | Paul | |
| 5,536,143 A * | 7/1996 | Jacala | F01D 5/187 416/96 R |
| 6,254,345 B1 * | 7/2001 | Harris | F01D 5/18 416/189 |
| 6,257,830 B1 * | 7/2001 | Matsuura | F01D 5/147 415/115 |
| 6,499,950 B2 * | 12/2002 | Willett | F01D 5/182 416/97 R |
| 6,506,013 B1 | 1/2003 | Burdgick et al. | |
| 7,004,721 B2 * | 2/2006 | Imbourg | F01D 5/187 415/115 |
| 7,431,562 B2 * | 10/2008 | Hooper | F01D 5/187 416/97 R |
| 7,901,180 B2 * | 3/2011 | Abdel-Messeh | F01D 5/187 415/115 |
| 8,353,669 B2 * | 1/2013 | Chon | F01D 5/187 416/193 A |
| 10,137,499 B2 * | 11/2018 | Moricca | B33Y 10/00 |
| 2012/0269615 A1 | 10/2012 | Kuwabara | |
| 2013/0028735 A1 | 1/2013 | Burt et al. | |
| 2014/0020359 A1 * | 1/2014 | Mimura | F01D 9/065 60/39.182 |

FOREIGN PATENT DOCUMENTS

| | | |
|---|---|---|
| EP | 2 551 458 A2 | 1/2013 |
| EP | 2 700 787 A1 | 2/2014 |
| JP | 10-231703 | 9/1998 |
| JP | 2001-132406 | 5/2001 |
| JP | 2001-317302 | 11/2001 |
| JP | 2010-53749 | 3/2010 |
| JP | 5655210 | 1/2015 |
| KR | 10-2013-0122689 | 11/2013 |
| WO | WO 2012/144244 A1 | 10/2012 |

OTHER PUBLICATIONS

International Search Report dated Jun. 2, 2015 in PCT/JP2015/001009, filed on Feb. 26, 2015(with English Translation).
Written Opinion dated Jun. 2, 2015 in PCT/JP2015/001009, filed on Feb. 26, 2015.

* cited by examiner

TURBINE ROTOR BLADE AND TURBINE

CROSS-REFERENCE TO RELATED APPLICATIONS

This application is a continuation of prior International Application No. PCT/JP2015/001009, filed on Feb. 26, 2015; the entire contents of all of which are incorporated herein by reference.

FIELD

Embodiments described herein generally relate to a turbine rotor blade and a turbine.

BACKGROUND

Increasing efficiency of power generation plants is in progress in response to demands for reduction of carbon dioxide, resource conservation, and the like. Accordingly, increasing temperature of working fluid or the like is actively in progress in gas turbine power generation plants. Various attempts have been made regarding cooling methods of rotor blades, stator blades and the like in accordance with the increasing temperature of the working fluid.

In recent years, power generation plants using carbon dioxide as the working fluid of turbines have been studied. In a power generation plant, carbon dioxide generated in a combustor is circulated as the working fluid in a system. Specifically, the power generation plant includes the combustor which combusts fuel such as hydrocarbon with oxygen. The carbon dioxide introduced to the combustor as the working fluid is introduced to the turbine together with the carbon dioxide and water vapor generated by combustion, and electricity is generated by rotating the turbine.

Turbine exhaust (carbon dioxide and water vapor) exhausted from the turbine is cooled by a heat exchanger, then water is removed to purify the carbon dioxide. This carbon dioxide is compressed to become supercritical fluid by a compressor. A major part of the compressed carbon dioxide is heated by the heat exchanger, to be circulated into the combustor. Out of the compressed carbon dioxide, the carbon dioxide corresponding to a flow rate of the carbon dioxide generated by the combustion of the fuel with the oxygen supplied from external is, for example, recovered or the like, to be utilized for other uses.

The inlet pressure of the turbine when the supercritical carbon dioxide as stated above is used as the working fluid becomes approximately 20 times compared to an inlet pressure of a turbine in a conventional gas turbine. Note that the temperature of the working fluid at the inlet of the turbine exceeds 1000 degrees centigrade, and is equivalent to that of the conventional gas turbine. Accordingly, when the carbon dioxide is used as the working fluid, the heat transfer coefficient at the blade surface of the rotor blade or the like becomes approximately 10 times compared to the conventional gas turbine.

DETAILED DESCRIPTION

As described above, in the power generation plant using the supercritical carbon dioxide as the working fluid, the heat transfer coefficient at the blade surface of the rotor blade or the like is higher than that in conventional gas turbines. It may be conceivable to increase a supply flow rate of a cooling medium introduced to a blade to accelerate cooling of the blade, but it is not preferable from a viewpoint of improving efficiency of a power generation system. A technology is, therefore, demanded capable of obtaining a blade cooling effect more than ever while suppressing the supply flow rate of the cooling medium.

A problem to be solved by the present embodiment is to provide a turbine rotor blade and a turbine capable of efficiently cooling while suppressing a supply flow rate of a cooling medium.

A turbine rotor blade of an embodiment comprises: a blade effective part; a snubber which is disposed on a radially outer side of the blade effective part; a platform which is disposed on a radially inner side of the blade effective part; and an implanted part which is disposed on a radially inner side of the platform; wherein at least one first flow path is formed inside the implanted part for a cooling medium to pass through to cool the implanted part; a second flow path is formed inside the platform for the cooling medium having passed through the first flow to pass through to cool the platform; at least one blade effective part flow path is formed inside the blade effective part for the cooling medium having passed through the second flow path to pass through to cool the blade effective part; at least one snubber flow path is formed inside the snubber for the cooling medium having passed through the blade effective part flow path to pass through to cool the snubber; and the at least one blade effective part flow path includes at least one third flow path for the cooling medium having passed through the second flow path to pass through inside the blade effective part on a front edge side, from the radially inner side toward the radially outer side to cool the front edge side of the blade effective part.

Hereinafter, embodiments of the present invention are described with reference to the drawings.

Figure 1:
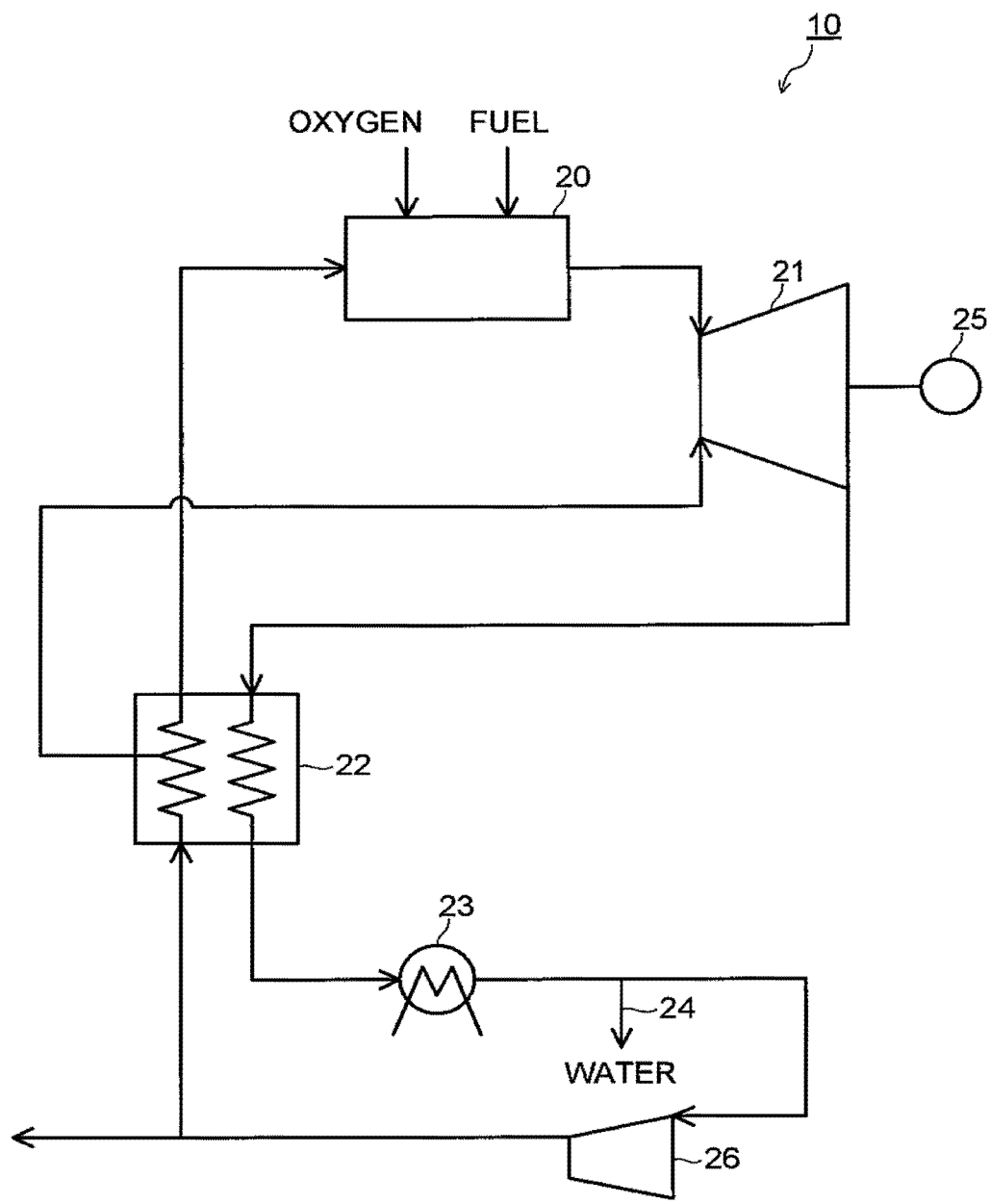
FIG. 1 is a system diagram of a gas turbine facility including a turbine equipped with rotor blades of an embodiment.

FIG. 1 is a system diagram of a gas turbine facility 10 including a turbine equipped with a turbine rotor blade of an embodiment. Note that FIG. 1 illustrates a case when the present invention is applied to the gas turbine facility 10 using a $CO_2$ turbine, but the present invention is applicable to other gas turbines and steam turbines without being limited to the $CO_2$ turbine.

As illustrated in FIG. 1, oxygen and fuel are supplied to a combustor 20 to be combusted. In addition, carbon dioxide which circulates as working fluid is also introduced to the combustor 20. Flow rates of the fuel and the oxygen are regulated to be of a stoichiometric mixture ratio (theoretical mixture ratio) in a state that, for example, they are completely mixed. For example, natural gas, hydrocarbon such as methane, coal gasification gas, and so on may be used as the fuel.

Combustion gas, which is exhausted from the combustor 20, and is made up of carbon dioxide and water vapor generated by combustion, and carbon dioxide being working fluid, is introduced to a turbine 21. The combustion gas which performed an expansion work in the turbine 21 passes through a heat exchanger 22, and further passes through another heat exchanger 23. When the combustion gas passes through the heat exchanger 23, the water vapor condenses into liquid water. The liquid water passes through a pipe 24 and is exhausted to the outside. Note that a generator 25 is coupled to the turbine 21.

The carbon dioxide (dry working gas) separated from the water vapor is compressed in a compressor 26 to be supercritical fluid. A pressure of the carbon dioxide becomes, for example, approximately 30 MPa at the outlet of the compressor 26.

Some part of the carbon dioxide compressed in the compressor 26 is heated in the heat exchanger 22, and is supplied to the combustor 20 as the working fluid. The carbon dioxide introduced to the combustor 20 is jetted from, for example, an upstream side of the combustor 20 to a combustion area together with fuel and oxidant, or is jetted from dilution holes or the like toward a downstream side of the combustion area in a combustor liner after cooling the combustor liner.

Besides, a part of the supercritical fluid carbon dioxide is introduced to the turbine 21 as a cooling medium through a pipe which is branched off from a middle of a flow path in the heat exchanger 22. A temperature of the cooling medium is preferably, for example, approximately 350 to 550 degrees centigrade due to reasons of a cooling effect and a thermal stress generated in the object to be cooled.

A remaining part of the carbon dioxide compressed in the compressor 26 is exhausted to the outside of the system. The carbon dioxide exhausted to the outside is recovered by, for example, a recovery device (not shown). Besides, the carbon dioxide exhausted to the outside can be utilized for, for example, EOR (Enhanced Oil Recovery) or the like employed at an oil drilling field. In the above-described system, for example, the carbon dioxide corresponding to a flow rate of the carbon dioxide generated by combustion of the fuel with the oxygen in the combustor 20 is exhausted to the outside of the system.

Next, a configuration of the turbine 21 equipped with a rotor blade (a turbine rotor blade) 34 of the embodiment is described.

Figure 2:
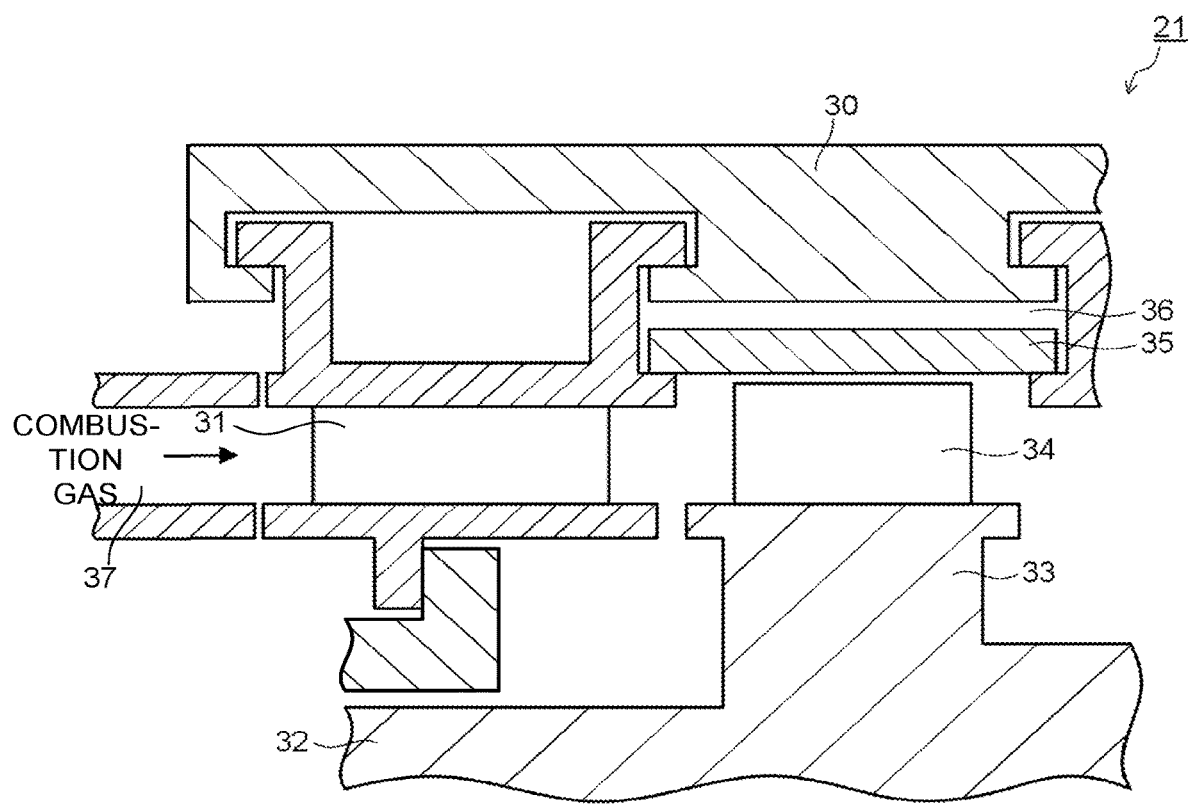
FIG. 2 is a view illustrating a part of a longitudinal section of the turbine equipped with the rotor blades of the embodiment.

FIG. 2 is a view illustrating a part of a longitudinal section of the turbine 21 equipped with the rotor blade 34 of the embodiment. As illustrated in FIG. 2, stator blades 31 are arranged at inner side of a cylindrical casing 30. The stator blades 31 are disposed in plural along a circumferential direction of the casing 30, and a stator blade cascade is formed by the stator blades 31.

Besides, there is disposed a rotor blade cascade which is formed by implanting a plurality (only one is illustrated in FIG. 2) of rotor blades (turbine rotor blades) 34 in a circumferential direction of a rotor disk 33 of a turbine rotor 32 on a direct downstream side of the stator blade cascade.

The stator blade cascades and the rotor blade cascades are alternately arranged along the axial direction of the turbine rotor 32. One turbine stage is formed by a stator blade cascade and a rotor blade cascade at the direct downstream of the stator blade cascade.

The outer peripheries of the rotor blades 34 are surrounded by, for example, shroud segments 35. The shroud segments 35 are provided to suppress input of heat from the combustion gas to the casing 30, and to keep proper gaps by adjusting the gaps with the tips of the rotor blades 34. Each of the shroud segments 35 is supported by, for example, the stator blade 31 which is fixed to the casing 30. In this case, a gap 36 extending in the circumferential direction is formed between the shroud segment 35 and the casing 30.

As stated above, a circular ring state combustion gas passage 37 including the stator blade cascades and the rotor blade cascades is formed at an inner side of the casing 30.

Figure 3:
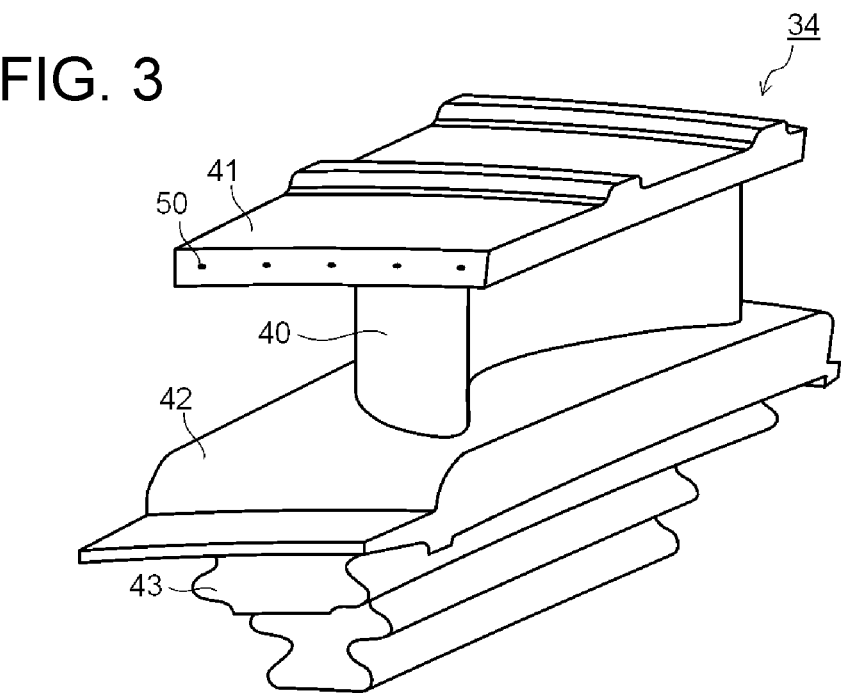
FIG. 3 is a view schematically illustrating an outline of the rotor blade of the embodiment.
Figure 4:
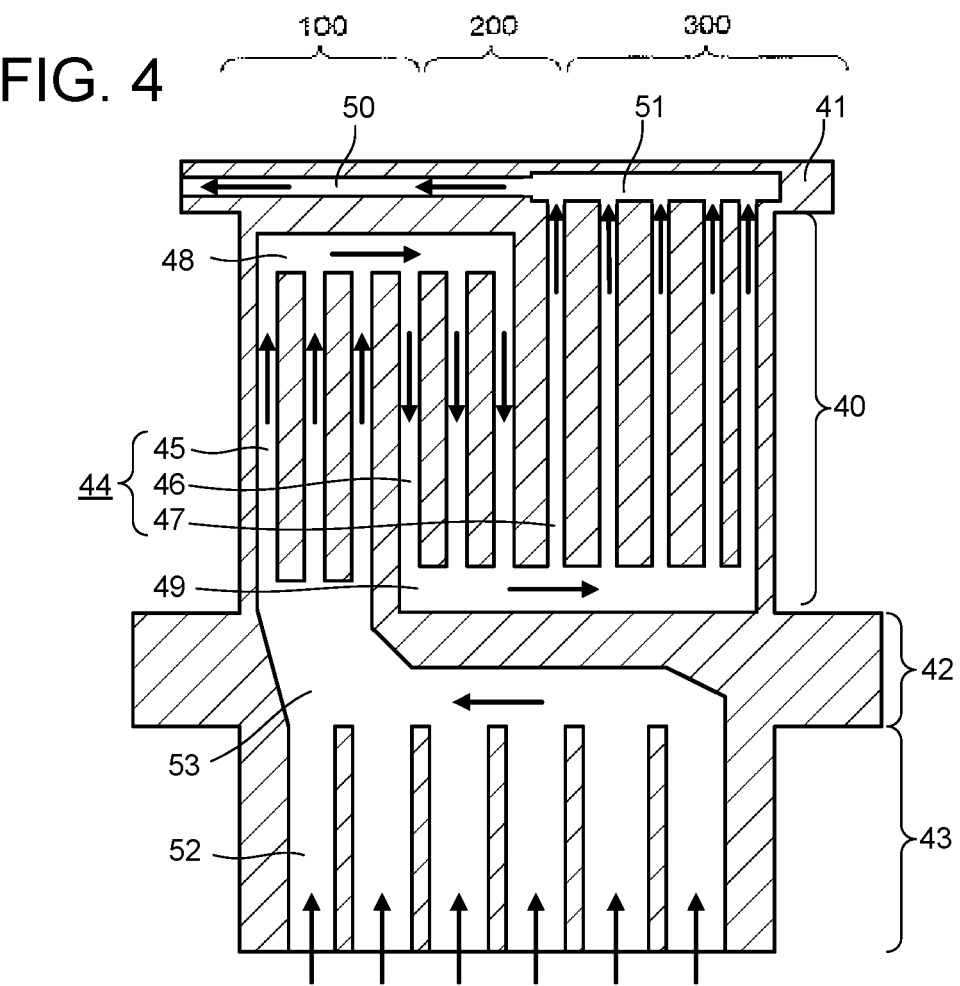
FIG. 4 is a perspective view illustrating a longitudinal section of the rotor blade of the embodiment.
Figure 5:
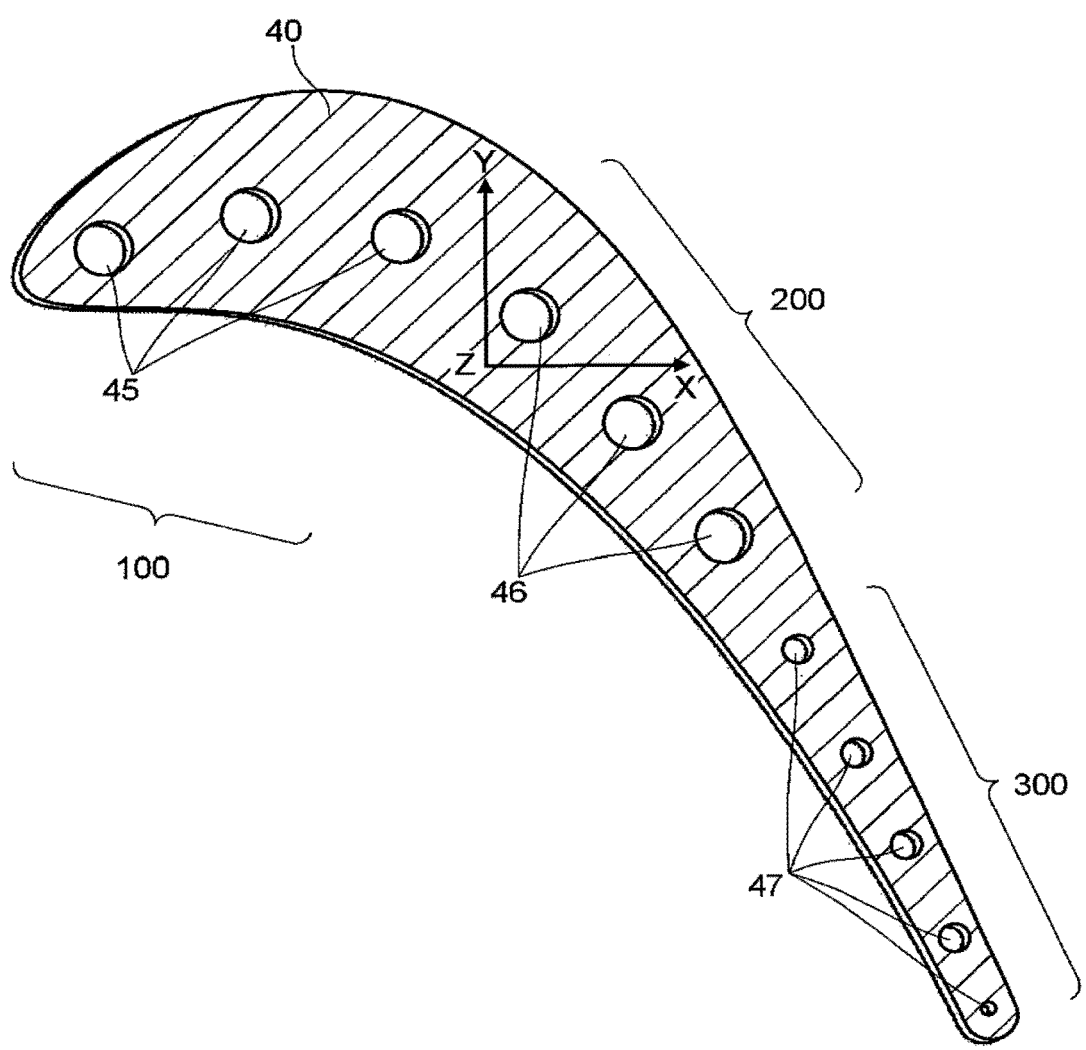
FIG. 5 is a view illustrating a transverse section of a blade effective part of the rotor blade of the embodiment.

Next, a constitution of the rotor blade 34 of the embodiment is described. FIG. 3 is a perspective view schematically illustrating an outline of the rotor blade 34 of the embodiment. FIG. 4 is a view illustrating a longitudinal section of the rotor blade 34 of the embodiment. FIG. 5 is a view illustrating a transverse section of a blade effective part 40 of the rotor blade 34 of the embodiment.

As illustrated in FIGS. 3 and 4, the rotor blade 34 includes a blade effective part 40, a snubber 41 which is disposed on the radially outer side (outer side in radial direction) of the blade effective part 40, a platform 42 which is disposed on the radially inner side (inner side in radial direction) of the blade effective part 40, and an implanted part 43 which is disposed on the radially inner side of the platform 42.

The blade effective part 40 forms a passage part through which combustion gas passes. The blade effective part 40 is constituted in, for example, a blade-shape where a front edge side 100 (for example, left sides in FIGS. 4 and 5) has a curved cross-sectional shape, and a rear edge side 300 (for example, a right side in FIG. 4, FIG. 5) has a tapered cross-sectional shape.

As illustrated in FIG. 4, blade effective part cooling holes 44 each to be a flow path of the cooling medium are formed inside the blade effective part 40 along the blade height direction. There is illustrated a case when each cross-sectional shape of the blade effective part cooling holes 44 is circular in FIG. 5. However, the cross-sectional shapes of the blade effective part cooling holes 44 are not particularly limited.

The blade effective part cooling holes 44 formed at the blade effective part 40 include front edge side cooling holes 45 positioned on the front edge side 100 of the rotor blade 34, center part cooling holes 46 positioned at a center part of the rotor blade 34, and rear edge side cooling holes 47 positioned on the rear edge side 300 of the rotor blade 34. Note that, for example, a center of a camber line of the blade effective part 40 or the like may be exemplified as a center part 200 of the blade effective part 40. Besides, a front edge side than the center part 200 of the blade effective part 40 is called as the front edge side 100, and a rear edge side than the center part 200 of the blade effective part 40 is called as the rear edge side 300.

FIGS. 4 and 5 illustrate an example where the front edge side cooling holes 45, the center part cooling holes 46, and the rear edge side cooling holes 47 are respectively provided in plural. However, it may be sufficient to form at least one front edge side cooling hole 45, one center part cooling hole 46, and one rear edge side cooling hole 47.

When a plurality of each of the front edge side cooling holes 45, the center part cooling holes 46, and the rear edge side cooling holes 47 are formed, constitutions thereof may be ones as, for example, described below.

One constitution may be that the front edge side cooling holes 45, the center part cooling holes 46, and the rear edge side cooling holes 47 are each formed at even intervals, and the hole size of the front edge side cooling holes 45, the hole size of the center part cooling holes 46, and the hole size of the rear edge side cooling holes 47 are made different depending on difference in blade thicknesses at parts where these holes are formed. That is, in this case, for example, cooling holes with a larger hole size are formed at a part where the blade thickness is thicker, and cooling holes with a smaller hole size are formed at a part where the blade thickness is thinner.

Another constitution is that, for example, the hole size of the front edge side cooling holes 45, the hole size of the center part cooling holes 46, and the hole size of the rear edge side cooling holes 47 are each made to be the same hole size, and intervals of the front edge side cooling holes 45, intervals of the center part cooling holes 46, and intervals of the rear edge side cooling holes 47 are made different depending on the difference in the blade thicknesses of the parts where these cooling holes are formed. That is, in this case, the cooling holes are formed at shorter intervals at the part where the blade thickness is thicker, and the cooling holes are formed at longer intervals at the part where the blade thickness is thinner.

In the example illustrated in FIGS. 4 and 5, three front edge side cooling holes 45 and three center part cooling holes 46 are formed to be in parallel with each other, and the hole sizes thereof are set to be the same. Five rear edge side cooling holes 47 are formed to be in parallel, and the hole sizes are set to be smaller than the hole sizes of the front edge side cooling holes 45 and the center part cooling holes 46.

A front edge side cavity 48 of a part of a flow path of the cooling medium is formed on the radially outer side of the front edge side of the blade effective part 40. Each of the front edge side cooling holes 45 and the center part cooling holes 46 are communicated with the front edge side cavity 48, and the front edge side cooling holes 45 and the center part cooling holes 46 are communicated through the front edge side cavity 48. The front edge side cavity 48 is a part where the cooling medium flowing in from the front edge side cooling holes 45 mixes, and is a part where the once mixed cooling medium branches into each of the center part cooling holes 46.

A rear edge side cavity 49 of a part of the flow path of the cooling medium is formed on the radially inner side of the rear edge side of the blade effective part 40. Each of the center part cooling holes 46 and the rear edge side cooling holes 47 are communicated with the rear edge side cavity 49, and the center part cooling holes 46 and the rear edge side cooling holes 47 are communicated through the rear edge side cavity 49. The rear edge side cavity 49 is a part where the cooling medium flowing in from the center part cooling holes 46 mixes, and is a part where the once mixed cooling medium branches into each of the rear edge side cooling holes 47. As stated above, in this embodiment, there is formed blade effective part flow paths made up of the front edge side cooling holes 45, the center part cooling holes 46, the rear edge side cooling holes 47, the front edge side cavity 48, and the rear edge side cavity 49, and thereby, it is possible to effectively cool a whole of the blade effective part 40.

Figure 6:
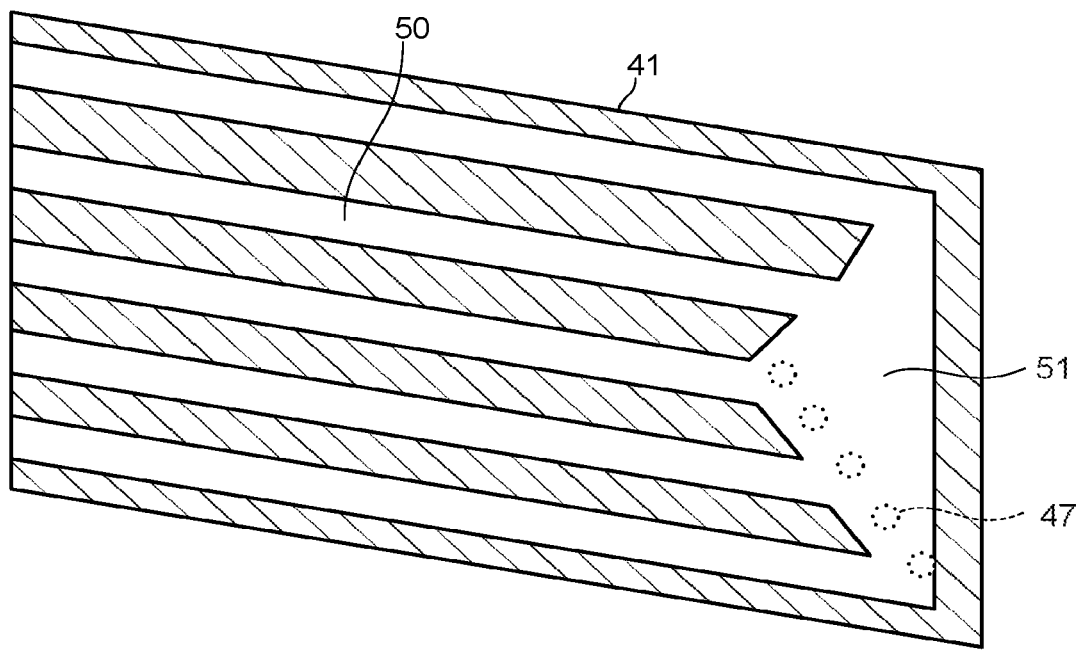
FIG. 6 is a view illustrating a transverse section of a snubber of the rotor blade of the embodiment.
Figure 7:
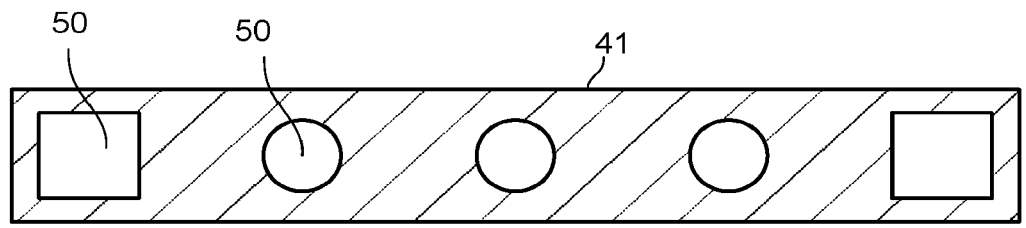
FIG. 7 is a view illustrating a longitudinal section of the snubber of the rotor blade of the embodiment.

Next, a constitution at a part of the snubber 41 of the rotor blade 34 is described. FIG. 6 is a view illustrating a transverse section of the snubber 41 of the rotor blade 34 of the embodiment. FIG. 7 is a view illustrating a longitudinal section of the snubber 41 of the rotor blade 34 of the embodiment.

As illustrated in FIG. 3, the snubber 41 has, for example, a polygonal flat-plate shape. The snubber 41 suppresses vibration which may be generated when the rotor blade 34 rotates, by a contact of the snubbers 41 of the adjacent rotor blades 34 with each other. As illustrated in FIGS. 4 and 6, snubber cooling holes 50 each to be a flow path of the cooling medium, and a snubber cavity 51 are formed inside the snubber 41. The snubber cavity 51 is formed on the rear edge side 300. The snubber cooling holes 50 are formed from the center part 200 toward the front edge side 100 of the rotor blade 34. There are illustrated an example where a plurality of snubber cooling holes 50 are formed in FIGS. 6 and 7. However, it may be sufficient to form at least one snubber cooling hole 50.

FIG. 7 illustrates an example where circular cross-sectional shapes and rectangular cross-sectional shapes of the snubber cooling holes 50 are combined to be arranged. However, the cross-sectional shape of the snubber cooling hole 50 is not particularly limited. As illustrated in FIG. 7, for example, there may be constituted such that a plurality of snubber cooling holes 50 are formed at even intervals, and the cross-sectional shapes thereof are made different.

As illustrated in FIG. 6, each of the snubber cooling holes 50 is communicated with the snubber cavity 51. Besides, each of the rear edge side cooling holes 47, which are illustrated by dashed lines in FIG. 6, is communicated with the snubber cavity 51. The snubber cooling holes 50 are, therefore, communicated with the rear edge side cooling holes 47 through the snubber cavity 51. The snubber cavity 51 is a part where the cooling medium flowing in from the rear edge side cooling holes 47 mixes, and a part where the once mixed cooling medium branches into each of the snubber cooling holes 50. Note that the snubber 41 may be integrally formed with, for example, the blade effective part 40. As stated above, in this embodiment, snubber flow paths are formed by the snubber cooling holes 50 and the snubber cavity 51, and it is thereby possible to effectively cool a whole of the snubber 41.

Figure 8:
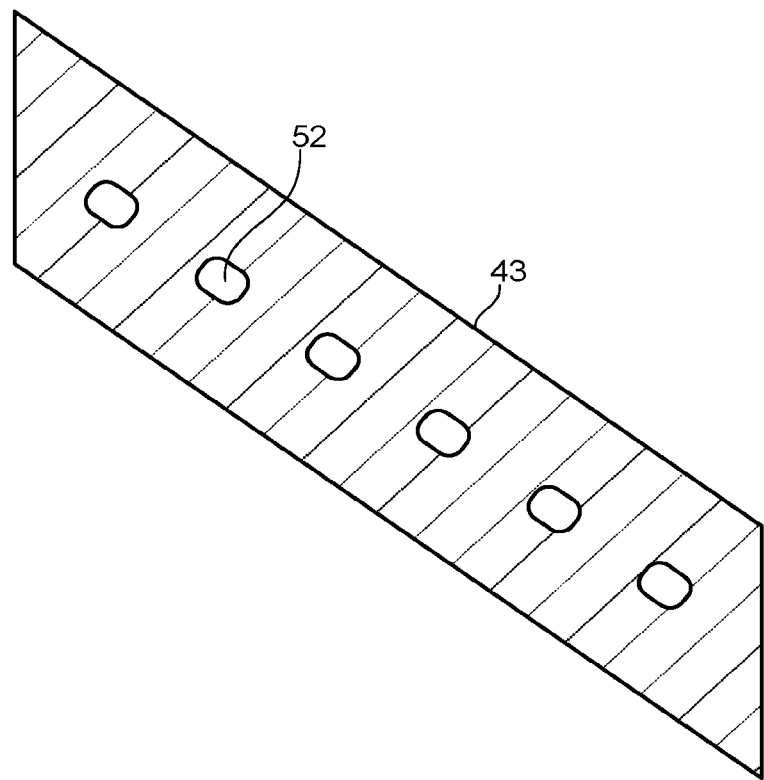
FIG. 8 is a view illustrating a transverse section of an implanted part of the rotor blade of the embodiment.
Figure 9:
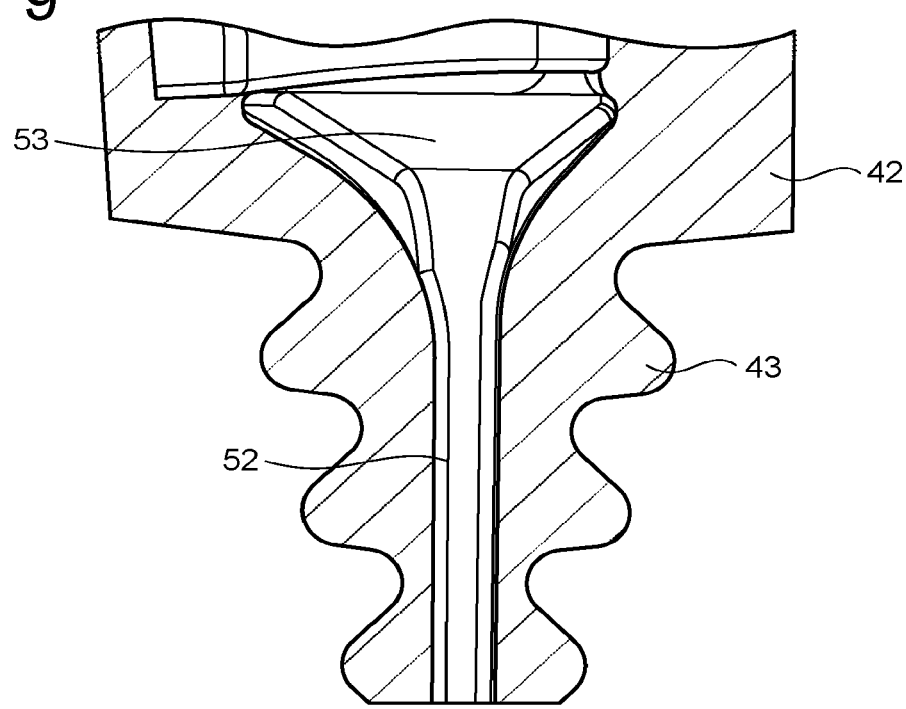
FIG. 9 is a view illustrating a longitudinal section of the implanted part of the rotor blade of the embodiment.

Next, constitutions of the platform 42 and the implanted part 43 of the rotor blade 34 of the embodiment are described. FIG. 8 is a view illustrating a transverse section of the implanted part 43 of the rotor blade 34 of the embodiment. FIG. 9 is a view illustrating a longitudinal section of the platform 42 and the implanted part 43 of the rotor blade 34 of the embodiment.

The implanted part 43 is formed on the radially inner side of the platform 42. Implanted cooling holes 52 each to be a part of the flow path of the cooling medium are formed inside the implanted part 43 so as to be headed from the radially inner side toward the radially outer side. Besides, an implanted cavity 53 of a part of the flow path of the cooling medium is formed inside the platform 42. There is illustrated a case when a cross-sectional shape of each implanted cooling hole 52 is rectangular in FIG. 8. However, the cross-sectional shape of the implanted cooling hole 52 is not particularly limited. Besides, there is illustrated an example where a plurality of implanted cooling holes 52 are formed in FIG. 8. However, it may be sufficient to form at least one implanted cooling hole 52.

The radially outer side end part of each of the implanted cooling holes 52 is communicated with the implanted cavity 53. Besides, the radially inner side end part of each of the front edge side cooling holes 45 is communicated with the implanted cavity 53. Accordingly, the implanted cooling holes 52 and the front edge side cooling holes 45 are communicated through the implanted cavity 53. The implanted cavity 53 is a part where the cooling medium flowing in from the implanted cooling holes 52 mixes, and a part where the once mixed cooling medium branches into each of the front edge side cooling holes 45.

The platform 42 may be integrally formed with, for example, the blade effective part 40. The implanted part 43 has a structure to fit the rotor disk 33. In the example illustrated in FIG. 9, the implanted part 43 has a Christmas-tree shape.

Next, flow of the cooling medium at the rotor blade 34 according to the embodiment is described with reference to FIGS. 4 to 9. Note that as described above, for example, supercritical fluid carbon dioxide may be used as the cooling medium.

The cooling medium introduced to a vicinity of the implanted part 43 flows into the rotor blade 34 from the plurality of implanted cooling holes 52 (first flow paths). The cooling medium flowing into the implanted cooling holes 52 flows in the implanted cooling holes 52 from the radially inner side toward the radially outer side as illustrated by arrows in FIG. 4, to flow into the implanted cavity 53 (a second flow path). At this time, the implanted part 43 is cooled.

The cooling medium flowing into the implanted cavity 53 flows in the implanted cavity 53 toward the front edge side cooling holes 45 (third flow paths), and at this time, the platform 42 is cooled. The cooling medium flowing into the plurality of front edge side cooling holes 45 flows in the front edge side cooling holes 45 from the radially inner side toward the radially outer side, and flows into the front edge side cavity 48 (a fourth flow path). At this time, the front edge side 100 of the blade effective part 40 is cooled.

The cooling medium flowing into the front edge side cavity 48 flows in the front edge side cavity 48 from the front edge side 100 toward the center part 200 side (the side of the center part cooling holes 46), and at this time, a part from the front edge side 100 to the center part 200 on the radially outer side of the blade effective part 40 is cooled. The cooling medium flowing into the plurality of center part cooling holes 46 (fifth flow paths) flows in the center part cooling holes 46 from the radially outer side toward the radially inner side, to flow into the rear edge side cavity 49 (a sixth flow path). At this time, the center part 200 of the blade effective part 40 is cooled.

The cooling medium flowing into the rear edge side cavity 49 flows in the rear edge side cavity 49 from the center part 200 side toward the rear edge side 300 (the side of the rear edge side cooling holes 47), and at this time, a part from the center part 200 to the rear edge side 300 on the radially inner side of the blade effective part 40 is cooled. The cooling medium flowing into the plurality of rear edge side cooling holes 47 (seventh flow paths) flows in the rear edge side cooling holes 47 from the radially inner side toward the radially outer side, and flows into the snubber cavity 51 (an eighth flow path). At this time, the rear edge side 300 of the blade effective part 40 is cooled.

The cooling medium flowing into the snubber cavity 51 flows in the snubber cavity 51 toward the snubber cooling holes 50 side, and at this time, the rear edge side 300 of the snubber 41 is cooled. The cooling medium flowing into the plurality of snubber cooling holes 50 (ninth flow paths) flows in the snubber cooling holes 50 toward the front edge side 100, and is exhausted from a front edge side end part to the outside of the rotor blade 34. At this time, a part from the center part 200 to the front edge side 100 of the snubber 41 is cooled. The cooling medium exhausted to the outside of the rotor blade 34 is mixed to combustion gas flowing through the combustion gas passage 37 (refer to FIG. 2), to flow to a downstream side.

As stated above, in the rotor blade 34 of this embodiment, the cooling medium flowing from the plurality of implanted cooling holes 52 (the first flow paths) to the inside of the rotor blade 34 cools each part of the rotor blade 34 by passing through the implanted cavity 53 (the second flow path), the plurality of front edge side cooling holes 45 (the third flow paths), the front edge side cavity 48 (the fourth flow path), the plurality of center part cooling holes 46 (the fifth flow paths), the rear edge side cavity 49 (the sixth flow path), the plurality of rear edge side cooling holes 47 (the seventh flow paths), the snubber cavity 51 (the eighth flow path), and the plurality of snubber cooling holes 50 (the ninth flow paths). Accordingly, it is possible to effectively cool the whole of the rotor blade 34 including the blade effective part 40, the snubber 41, the platform 42 and the implanted part 43, while suppressing the supply flow rate of the cooling medium.

Besides, for example, the compressed supercritical fluid carbon dioxide is used as the cooling medium, and thereby, it is possible to increase heat flux from the rotor blade 34 to the cooling medium, and to effectively perform the cooling. Further, in the rotor blade 34 of this embodiment, it is constituted such that the cooling medium after finishing the cooling of the rotor blade 34 is discharged into the combustion gas passage 37 from the front edge side 100 where a pressure is higher than the rear edge side 300. It is, therefore, possible to set the diameter of the openings at the part discharging the cooling medium from the snubber cooling holes 50 into the combustion gas passage 37 large. It is thereby possible to suppress occurrence of clogging or the like at the openings.

Note that the constitution of the rotor blade 34 of the embodiment is not limited to the above-stated constitution. For example, a thermal barrier coating (TBC) may be applied on a blade surface of the rotor blade 34 which is exposed to or in contact with the combustion gas (working fluid) flowing through the combustion gas passage 37. A thermal barrier coating layer may be formed of, for example, a metal bonding layer excellent in resistance to environment, and a ceramic top layer with low thermal conductivity. Note that a constitution of the thermal barrier coating layer is not particularly limited, and it is possible to apply a generally used constitution in accordance with the usage environment. The thermal barrier coating layer is included as stated above, and thereby, it is possible to reduce the heat input flow rate from the combustion gas to the rotor blade 34, and to reduce the flow rate of the cooling medium.

Besides, it may be constituted such that ridge parts protruding from an inner wall surface are included at least at a part of the inner wall surfaces of the blade effective part cooling holes 44, the snubber cooling holes 50, the implanted cooling holes 52, the front edge side cavity 48, the rear edge side cavity 49, the snubber cavity 51, and the implanted cavity 53.

Figure 10:
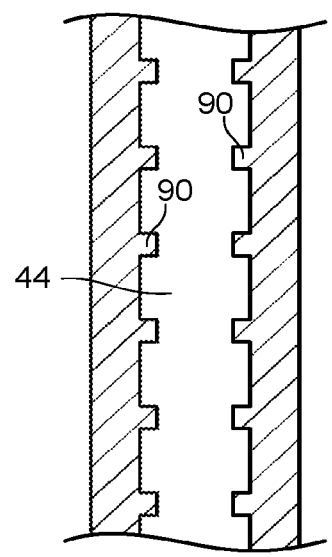
FIG. 10 is a view illustrating a cross section of a cooling hole part of the blade effective part of the rotor blade of the embodiment.

FIG. 10 is a view illustrating a longitudinal section of the blade effective part cooling hole 44 including ridge parts 90 protruding perpendicularly from the inner wall surface in the rotor blade 34 of the embodiment. As illustrated in FIG. 10, it may be constituted such that a plurality of ridge parts 90 are included in the longitudinal direction at the inner wall surface of the blade effective part cooling hole 44. Note that a shape of the ridge part 90 is not limited thereto. A structure may be applicable as long as the ridge part 90 protrudes to the inner side of the inner wall surface to disturb the flow of the cooling medium. The ridge parts 90 are included as stated above, and thereby, the flow of the cooling medium is disturbed, and the heat transfer rate between the cooling hole inner wall surface and the cooling medium is enhanced. It is thereby possible to effectively cool the rotor blade 34.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A turbine rotor blade, comprising:
   a blade effective part;
   a snubber which is disposed on a radially outer side of the blade effective part;
   a platform which is disposed on a radially inner side of the blade effective part; and
   an implanted part which is disposed on a radially inner side of the platform; wherein
   at least one first flow path is formed inside the implanted part for a cooling medium to pass through to cool the implanted part;
   a second flow path is formed inside the platform for the cooling medium having passed through the at least one first flow path to pass through to cool the platform;
   at least one blade effective part flow path is formed inside the blade effective part for the cooling medium having passed through the second flow path to pass through to cool the blade effective part;
   at least one snubber flow path is formed inside the snubber for the cooling medium having passed through the at least one blade effective part flow path to pass through to cool the snubber;
   each of the at least one blade effective part flow path includes at least one third flow path for the cooling medium having passed through the second flow path to pass through inside the blade effective part on a front edge side, from the radially inner side toward the radially outer side to cool the front edge side of the blade effective part; and
   the at least one first flow path, the second flow path, the at least one blade effective part flow path and the at least one snubber flow path are configured so that all the cooling medium flowing into the at least one first flow path from outside of the turbine rotor blade flows out to the second flow path, and then, to the at least one third flow path, and then, to the at least one snubber flow path, and then, flows out of the turbine rotor blade at a front edge side of the snubber flow path.

2. The turbine rotor blade according to claim 1, wherein the at least one blade effective part flow path includes:
   a fourth flow path for the cooling medium having passed through the third flow path to pass through inside the blade effective part on the radially outer side, from the front edge side toward a center part to cool the blade effective part from the front edge side to the center part on the radially outer side;
   at least one fifth flow path for the cooling medium having passed through the fourth flow path to pass through inside the blade effective part at the center part, from the radially outer side toward the radially inner side to cool the center part of the blade effective part;
   a sixth flow path for the cooling medium having passed through the fifth flow path to pass through inside the blade effective part on the radially inner side, from the center part toward a rear edge side to cool the blade effective part from the center part to the rear edge side on the radially inner side; and
   at least one seventh flow path for the cooling medium having passed through the sixth flow path to pass through inside the blade effective part on the rear edge side, from the radially inner side toward the radially outer side to cool the rear edge side of the blade effective part.

3. The turbine rotor blade according to claim 2, wherein the snubber flow path includes:
   an eighth flow path for the cooling medium having passed through the seventh flow path to pass through inside the snubber on the rear edge side to cool the rear edge side of the snubber; and
   at least one ninth flow path for the cooling medium having passed through the eighth flow path to pass through inside the snubber, from the center part toward the front edge side to cool the snubber from the center part to the front edge side.

4. The turbine rotor blade according to claim 3, wherein
   the at least one first flow path includes a plurality of the first flow paths,
   the at least one third flow path includes a plurality of the third flow paths,
   the at least one fifth flow path includes a plurality of the fifth flow paths,
   the at least one seventh flow path includes a plurality of the seventh flow paths, and a
   the at least one ninth flow path includes plurality of the ninth flow paths.

5. The turbine rotor blade according to claim 4, wherein
   the plurality of first flow paths and the plurality of third flow paths are communicated with the second flow path,
   the plurality of third flow paths and the plurality of fifth flow paths are communicated with the fourth flow path,
   the plurality of fifth flow paths and the plurality of seventh flow paths are communicated with the sixth flow path, and
   the plurality of seventh flow paths and the plurality of ninth flow paths are communicated with the eighth flow path.

6. The turbine rotor blade according to claim 1, wherein the cooling medium is carbon dioxide.

7. A turbine, comprising:
   a casing;
   a plurality of stator blades arranged at an inner side of the casing;
   a turbine rotor;
   a plurality of rotor blades implanted in the turbine rotor, wherein each one of the turbine rotor blades include:
   a blade effective part;
   a snubber which is disposed on a radially outer side of the blade effective part;
   a platform which is disposed on a radially inner side of the blade effective part; and
   an implanted part which is disposed on a radially inner side of the platform; wherein at least one first flow path is formed inside the implanted part for a cooling medium to pass through to cool the implanted part;
a second flow path is formed inside the platform for the cooling medium having passed through the at least one first flow path to pass through to cool the platform;
at least one blade effective part flow path is formed inside the blade effective part for the cooling medium having passed through the second flow path to pass through to cool the blade effective part;
at least one snubber flow path is formed inside the snubber for the cooling medium having passed through the at least one blade effective part flow path to pass through to cool the snubber;
the at least one blade effective part flow path includes at least one third flow path for the cooling medium having passed through the second flow path to pass through inside the blade effective part on a front edge side, from the radially inner side toward the radially outer side to cool the front edge side of the blade effective part; and
the first flow path, the second flow path, the at least one blade effective part flow path and the at least one snubber flow path are configured so that all the cooling medium flowing into the at least one first flow path from outside of the turbine rotor blade flows out to the second flow path, and then, to the at least one third flow path, and then, to the at least one snubber flow path, and then, flows out of the turbine rotor blade at a front edge side of the snubber flow path.

8. The turbine according to claim 7, wherein the cooling medium is carbon dioxide.

* * * * *